US012434483B2

(12) United States Patent
Yamamoto

(10) Patent No.: US 12,434,483 B2
(45) Date of Patent: Oct. 7, 2025

(54) CONTAINER AND METHOD FOR PRODUCING CONTAINER

(71) Applicant: BROTHER KOGYO KABUSHIKI KAISHA, Nagoya (JP)

(72) Inventor: Jiro Yamamoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 326 days.

(21) Appl. No.: 18/145,379

(22) Filed: Dec. 22, 2022

(65) Prior Publication Data

US 2023/0311530 A1 Oct. 5, 2023

(30) Foreign Application Priority Data

Mar. 31, 2022 (JP) ................................ 2022-057885

(51) Int. Cl.
*B41J 2/175* (2006.01)
*B67D 1/08* (2006.01)

(52) U.S. Cl.
CPC ....... *B41J 2/17553* (2013.01); *B41J 2/17523* (2013.01); *B41J 2002/17516* (2013.01); *B67D 2001/0827* (2013.01)

(58) Field of Classification Search
CPC ................ B41J 2/17553; B41J 2/17523; B41J 2002/17516; B67D 2001/0827
See application file for complete search history.

(56) References Cited

U.S. PATENT DOCUMENTS 4,901,886 A * 2/1990 Kirschner ............ B67D 1/1234 222/105
5,138,344 A 8/1992 Ujita
5,156,300 A * 10/1992 Spahni ............... B65D 83/0055 222/464.2
5,577,638 A * 11/1996 Takagawa ............ B67D 3/0019 222/105
5,621,445 A * 4/1997 Fong .................... B41J 2/17513 347/87
2001/0024225 A1 9/2001 Ishizawa et al.
2001/0040612 A1 11/2001 Shimizu
(Continued)

FOREIGN PATENT DOCUMENTS

JP H11-277759 A 10/1999
JP 2000-103079 A 4/2000
(Continued)

*Primary Examiner* — Frederick C Nicolas
(74) *Attorney, Agent, or Firm* — KENEALY VAIDYA LLP

(57) ABSTRACT

There is provided a container including: a case with an opening and having a lower wall and a lateral wall, a cover configured to move between a first position blocking part of the opening of the case, and a second position uncovering the opening of the case, a pouch having a flexible bag and a vent plug, and a locking part configured to move between a position to lock the cover on the case, and a position to unlock the same. The opening exposes an internal space via part of the lateral wall. The lateral wall defining the opening has a locking portion to lock the vent plug. When the cover is in the first position, a leading end of the cover defines the opening. The locking part is positioned at the lateral wall defining the opening or at the leading end.

5 Claims, 9 Drawing Sheets

(56) References Cited

U.S. PATENT DOCUMENTS

| | | | | |
|---|---|---|---|---|
| 2008/0277414 | A1* | 11/2008 | Macler ................ | B67D 3/0067 222/105 |
| 2015/0273501 | A1 | 10/2015 | Naito et al. | |
| 2015/0273842 | A1 | 10/2015 | Aoki et al. | |
| 2016/0288511 | A1 | 10/2016 | Koizumi et al. | |
| 2016/0288514 | A1 | 10/2016 | Koizumi et al. | |
| 2017/0087855 | A1 | 3/2017 | Takagiwa | |
| 2017/0087856 | A1 | 3/2017 | Takagiwa | |

FOREIGN PATENT DOCUMENTS

| | | | |
|---|---|---|---|
| JP | 2001-353882 | A | 12/2001 |
| JP | 2002-1980 | A | 1/2002 |
| JP | 2004-291446 | A | 10/2004 |
| JP | 2015-182410 | A | 10/2015 |
| JP | 2015-193093 | A | 11/2015 |
| JP | 2016-187876 | A | 11/2016 |
| JP | 2016-187894 | A | 11/2016 |
| JP | 2016-187898 | A | 11/2016 |
| JP | 2016-187899 | A | 11/2016 |
| JP | 2017-65152 | A | 4/2017 |
| JP | 2017-65153 | A | 4/2017 |

* cited by examiner

CONTAINER AND METHOD FOR PRODUCING CONTAINER

REFERENCE TO RELATED APPLICATIONS

This application claims priority from Japanese Patent Application No. 2022-057885 filed on Mar. 31, 2022. The entire content of the priority application is incorporated herein by reference.

BACKGROUND ART

In an image recording apparatus of ink jet type, for example, it is possible to replace the cartridge containing an ink for refill with the ink. Such a cartridge may have a bag containing an ink and a case accommodating the bag.

Conventionally, there is known a configuration of a case having a vent plug support and accommodating a liquid container bag having a vent plug. A publicly known case is comprised of a first case and a second case and, by relative sliding between the two cases, the internal space of the case is opened or closed.

DESCRIPTION

For a comparatively small cartridge, it is easy to put the liquid container bag filled with an ink into the case. However, if a large amount of liquid is to be contained, then the bag has to increase in size and, filled with the liquid, its weight also increases. Further, filled with the liquid, the bag expands considerably. However, if the bag is flexed or folded in the case, then the liquid filling the bag is liable to detention at the folded part so as to cause an obstacle in the way of filling the bag with the liquid.

The present disclosure is conceived in view of the above situation, and an object thereof is to provide a method for easily accommodating a pouch into the case and assemble the same.

According to a first aspect of the present disclosure, there is provided a container including: a case with an opening; a cover; a pouch and a locking part. The case includes a lower wall and a lateral wall upstanding from the lower wall. The cover includes a leading end, and a base end being opposed to the leading end and linked to the case in a rotatable manner. The cover is configured to move between a first position blocking a part of the opening of the case and a second position uncovering the opening of the case. The pouch includes a flexible bag and a vent plug. The locking part is configured to move between a lock position to hold the cover in the first position on the case and an unlock position allowing the cover to rotate from the first position. The opening exposes an internal space via a part of the lateral wall. The lateral wall defining the opening includes a locking portion to lock the vent plug. In a case that the cover is at the first position, the leading end of the cover defines the opening. The locking part is positioned at the lateral wall defining the opening or at the leading end of the cover.

It is possible to carry out the following operation from the lateral wall defining the opening: moving the cover in the first position to the second position; accommodating the pouch into the internal space of the case; moving the cover in the second position to the first position; and moving the locking part from the unlock position to the lock position. By virtue of this, it is easy to accommodate the pouch into the case and assemble the same.

Figure 7:
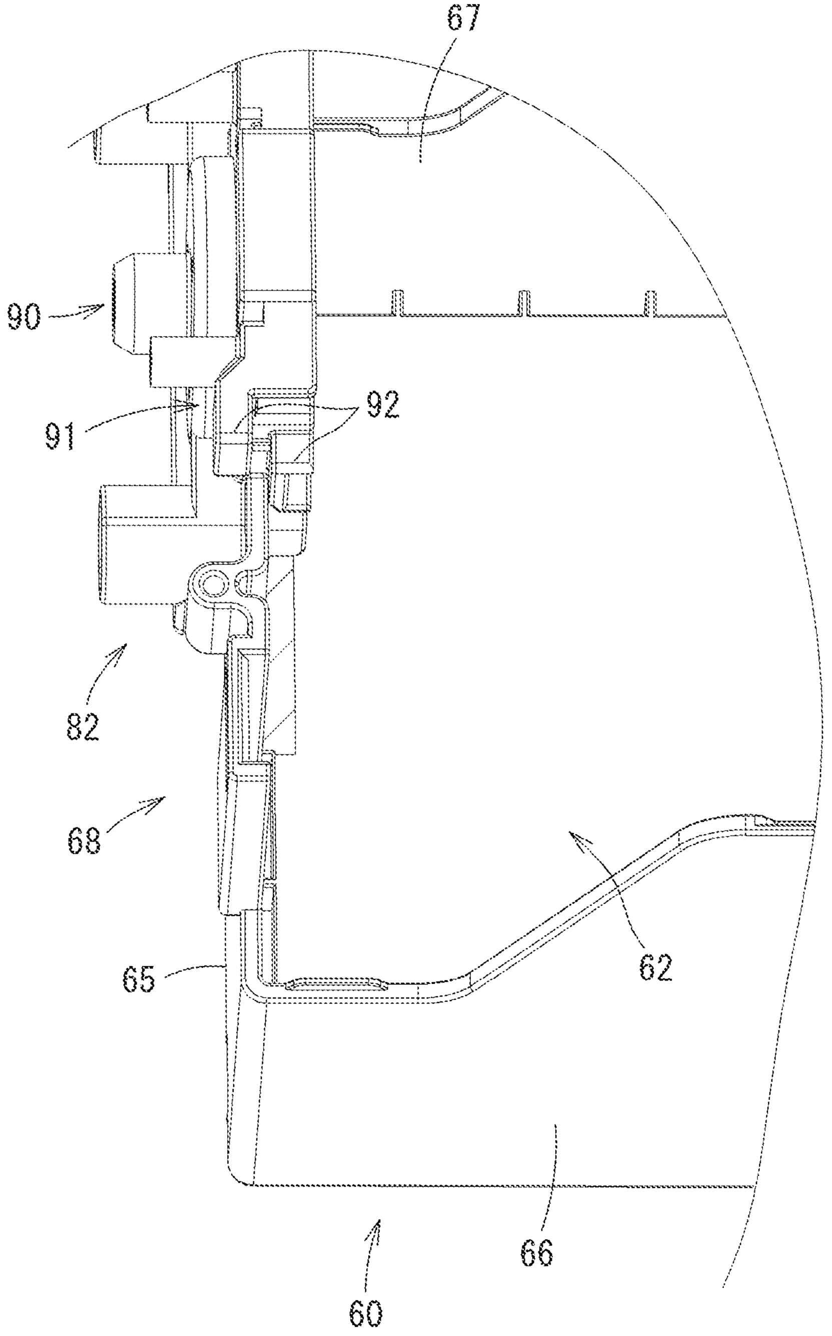

FIG. 7 is an enlarged perspective view depicting that a flange 91 of the pouch 80 is locked on a rear wall 65 of a case 60.

Figure 8:
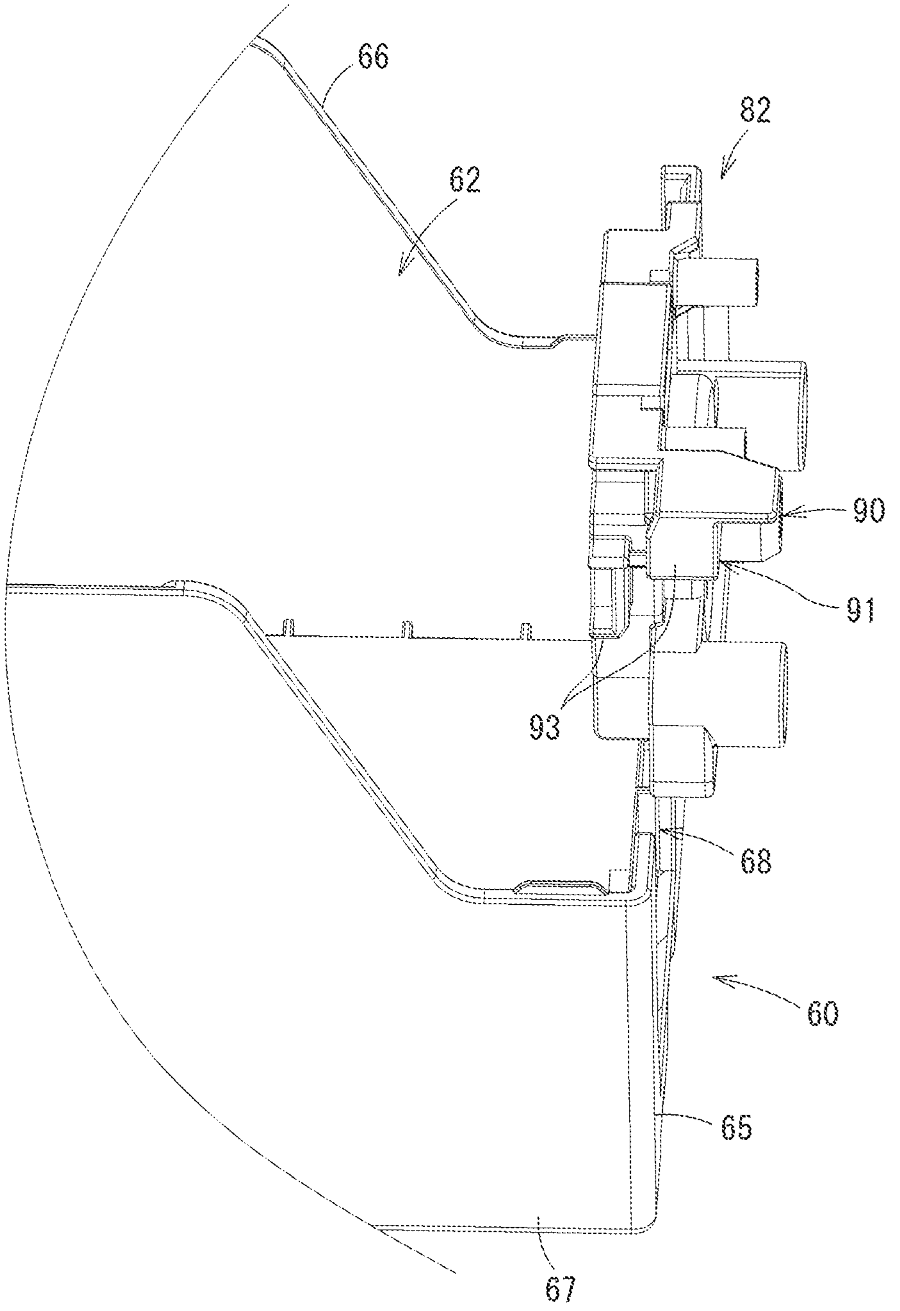

FIG. 8 is another enlarged perspective view depicting that the flange 91 of the pouch 80 is locked on the rear wall 65 of the case 60.

Figure 9:
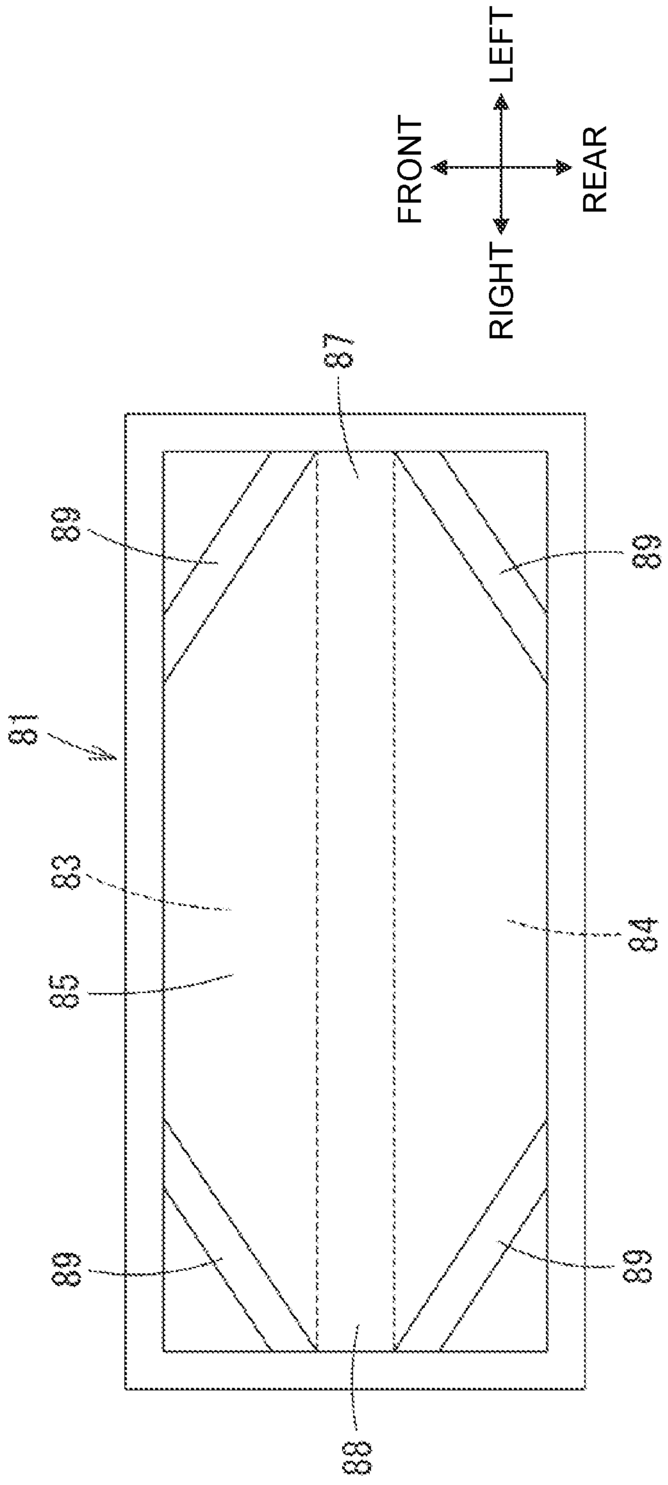

FIG. 9 is a plan view depicting a folded bag 81.

An embodiment of the present disclosure will be explained below. Note that, needless to say, this embodiment presents merely one example of the present disclosure, and can undergo changes and modifications without departing from the true spirit and scope of the present disclosure. In the following explanation, an up-down direction is defined on such a reference as with an image recording apparatus 100 being placed in a usable condition (the state of FIG. 1), a front-rear direction is defined regarding the side where a discharge port 33 is provided as the near side (or the front side), and a left-right direction is defined when the image recording apparatus 100 is viewed from the near side (the front side).

<Outer Appearance Configuration of the Image Recording Apparatus 100>

Figure 1:
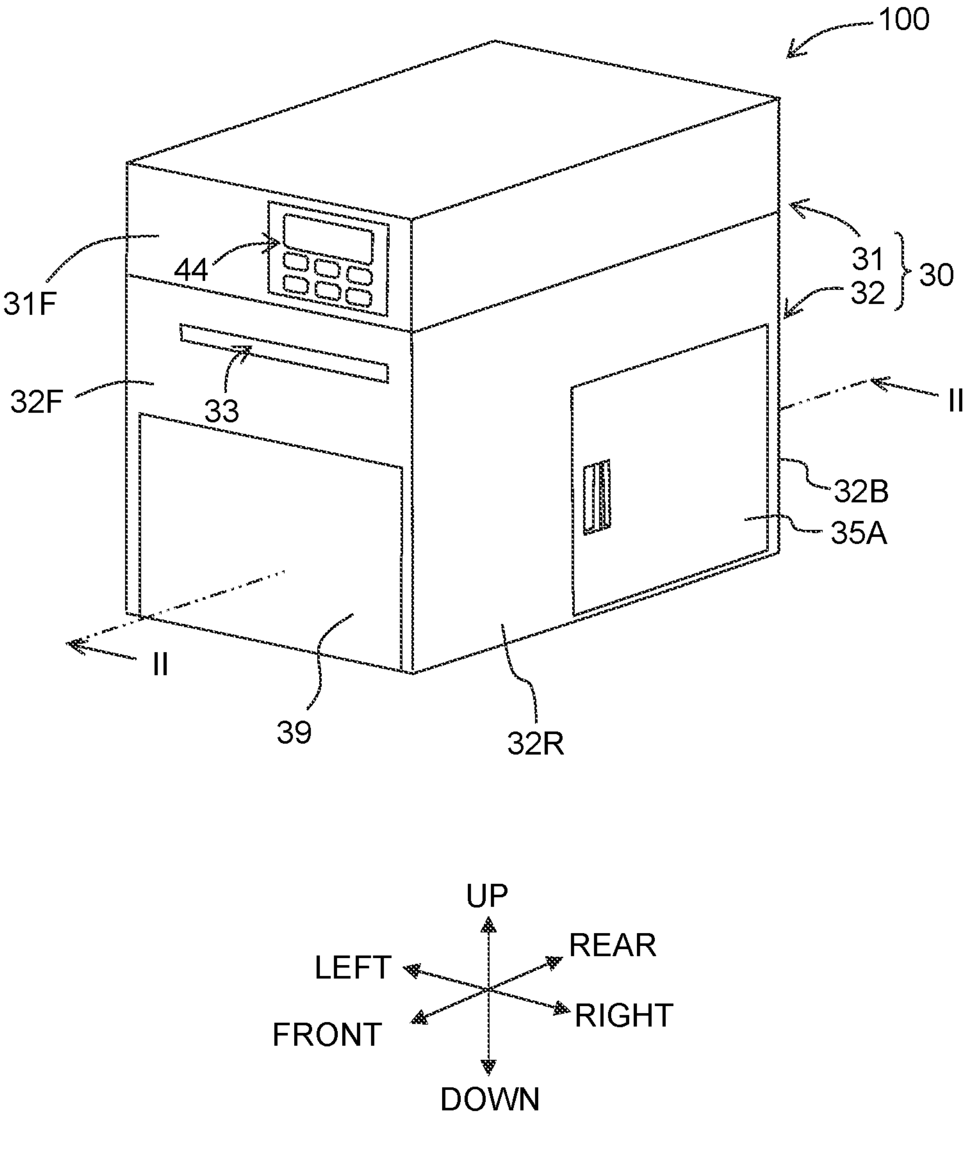
FIG. 1 is a perspective view of an outer appearance of an image recording apparatus 100.

The image recording apparatus 100 depicted in FIG. 1 is configured to record an image on a sheet S of a roll 37 (see FIG. 2) by an ink jet recording method.

As depicted in FIG. 1, the image recording apparatus 100 includes a casing 30. The casing 30 includes an upper casing 31 and a lower casing 32. The upper casing 31 and the lower casing 32 are shaped into an approximate cuboid as a whole, and sized as disposable on a desk. That is, the image recording apparatus 100 is suitable to be placed on a desk for use. Of course, the image recording apparatus 100 may also be placed on a floor or rack for use. Note that in the casing 30, a frame may be provided appropriately for supporting every member.

Figure 2:
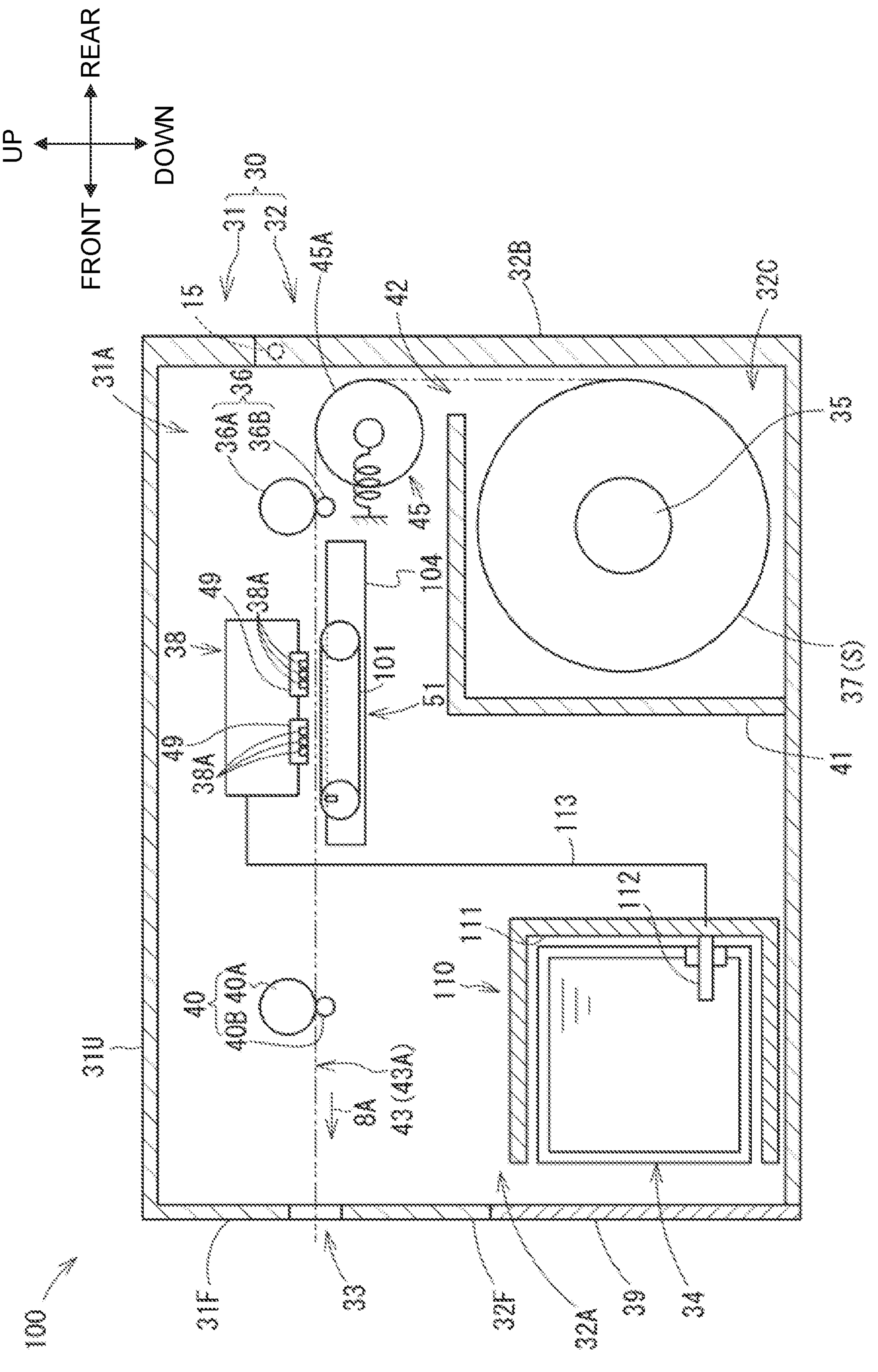
FIG. 2 is a cross section view depicting the cross section II-II of FIG. 1.

As depicted in FIG. 2, the upper casing 31 is supported by the lower casing 32 in a rotatable manner. The upper casing 31 is rotatable between an opened position and a closed position as depicted in FIG. 2 about a rotating shaft 15 provided at the lower end at the rear side to extend in the left-right direction. Note that the upper casing 31 is not limited to the configuration of rotating on the rotating shaft 15 but may be rotate on a hinge or the like, for example.

As depicted in FIG. 2, when the upper casing 31 is in the closed position, an internal space 31A of the upper casing 31 and an internal space 32A of the lower casing 32 are unexposed to the outside. When the upper casing 31 is in the opened position, the internal space 31A of the upper casing 31 and the internal space 32A of the lower casing 32 are exposed to the outside.

As depicted in FIG. 1, a front surface 32F of the lower casing 32 is formed with the slit-like discharge port 33 elongated in the left-right direction. The sheet S (see FIG. 2) finished with image recording is discharged from the discharge port 33.

A front surface 31F of the upper casing 31 is provided with an operation panel 44. A user can use the operation panel 44 for inputs in order to operate the image recording apparatus 100 and determine various settings.

As depicted in FIG. 1, a right cover 35A is positioned in a right surface 32R of the lower casing 32. The right cover 35A is opened and closed to expose and shield a holder 35 and the like (see FIG. 2) positioned in a sheet accommodation space 32C.

As depicted in FIG. 1, a front cover 39 is positioned in the front surface 32F of the lower casing 32. The front cover 39 can let its upper end fall frontward to open about an unshown rotating shaft extending along the left-right direction in the vicinity of its lower end. The front cover 39 is opened and closed to expose and shield an installation case 110 and the like (see FIG. 2) positioned in the internal space 32A of the lower casing 32.

<Internal Configuration of the Image Recording Apparatus 100>

As depicted in FIG. 2, in the internal spaces 31A and 32A, there are arranged the holder 35, a conveyance roller pair 36, a conveyance roller pair 40, a head unit 38, a platen 51, the ink tank 34, the installation case 110, and the like. Note that, without illustration, a fixation unit, an image sensor, a cutter, a maintenance mechanism and the like may also be positioned in the internal space 32A.

A partition wall 41 is provided in the internal space 32A. The partition wall 41 partitions a rear lower part of the lower casing 32 to define the sheet accommodation space 32C. The sheet accommodation space 32C is enclosed by the partition wall 41 and the lower casing 32 to become a space secluded from the head unit 38 and the like.

The roll 37 is accommodated in the sheet accommodation space 32C. The roll 37 has a core pipe and the elongate sheet S. The sheet S is rolled around the core pipe into a roll shape in a circumferential direction of the axial core of the core pipe. The sheet S may be as wide as from the minimum width to the maximum width at which the image recording apparatus 100 can record images. That is, the sheet accommodation space 32C can accommodate the roll 37 of a plurality of types with different widths. Note that the roll 37 may not have a core pipe such that the sheet S may be rolled on the holder 35 in a removable manner into a roll shape. Further, the sheet accommodation space 32C may also accommodate fanfold paper.

As depicted in FIG. 2, the sheet accommodation space 32C is open upward at the rear side. In detail, an interspace 42 is formed between the partition wall 41 and a rear surface 32B, that is, in an upper part at the rear side of the roll 37. The conveyance roller pairs 36 and 40 rotate to pull out the sheet S upward from the rear end of the roll 37 and guide the same to a tensioner 45 via the interspace 42.

The tensioner 45 is positioned above the partition wall 41 in a rear part of the internal space 32A. The tensioner 45 has an outer circumference 45A facing the outside of the lower casing 32. The outer circumference 45A is sized to be larger than the maximum width of the sheet in the left-right direction, and shaped symmetrically to the center of paper passage (the center of the sheet S in the left-right direction). The upper end of the outer circumference 45A is positioned at almost the same vertical level as a nip D of the conveyance roller pair 36 in the up-down direction.

The sheet S pulled out from the roll 37 is brought on in contact with the outer circumference 45A. The sheet S is curved frontward along the outer circumference 45A, extending in a conveyance orientation 8A to be guided to the conveyance roller pair 36. The conveyance orientation 8A is a frontward orientation along the front-rear direction. The tensioner 45 applies a tension to the sheet S by a publicly known method.

The conveyance roller pair 36 is positioned in front of the tensioner 45. The conveyance roller pair 36 has a conveyance roller 36A and a pinch roller 36B. The conveyance roller 36A is in contact with the pinch roller 36B at almost the same vertical level as the upper end of the outer circumference 45A.

The conveyance roller pair 40 is positioned in front of the conveyance roller pair 36. The conveyance roller pair 40 has a conveyance roller 40A and a pinch roller 40B. The conveyance roller 40A is in contact with the pinch roller 40B at almost the same vertical level as the upper end of the outer circumference 45A.

A driving force is transmitted from an unshown motor to the conveyance rollers 36A and 40A to rotate the same. The conveyance roller pair 36 in rotation nips the sheet S extending from the tensioner 45 in the conveyance orientation 8A to send out the same in the conveyance orientation 8A along a conveyance surface 43A. The conveyance roller pair 40 in rotation nips the sheet S sent out from the conveyance roller pair 36 to send out the same in the conveyance orientation 8A. Further, the conveyance roller pairs 36 and 40 rotate to pull out the sheet S toward the tensioner 45 through the interspace 42 from the sheet accommodation space 32C.

As depicted in FIG. 2, a conveyance path 43 is formed in the internal space 32A from the upper end of the outer circumference 45A to the discharge port 33. The conveyance path 43 is a space through which the sheet S is passable, extending almost linearly along the conveyance orientation 8A. In detail, the conveyance path 43 expands in the conveyance orientation 8A and the left-right direction and along the long conveyance surface 43A in the conveyance orientation 8A. Note that in FIG. 2, the conveyance surface 43A is depicted with a two-dot chain line in depicting the conveyance path 43. The conveyance path 43 is defined by guide members (not shown) positioned apart from each other in the up-down direction, the head unit 38, the platen 51, and the like.

The head unit 38 is positioned downstream from the conveyance roller pair 36 in the conveyance orientation 8A and above the conveyance path 43. The head unit 38 has a head module 49 having a plurality of nozzles 38A. From the plurality of nozzles 38A, an ink is discharged downward toward the sheet S supported by a conveyance belt 101. By virtue of this, image is recorded on the sheet S.

The platen 51 is positioned downstream from the conveyance roller pair 36 in the conveyance orientation 8A and below the conveyance path 43. The platen 51 faces the head unit 38 from below the head unit 38. The platen 51 has a support 104 and the conveyance belt 101. The conveyance belt 101 supports the sheet S which is conveyed by the conveyance roller pair 36 in the conveyance orientation 8A, and positioned right below the head unit 38. The conveyance belt 101 supports and conveys the sheet S in the conveyance orientation 8A.

The installation case 110 is box-like and open frontward, being positioned in the vicinity of the front end and the lower end of the lower casing 32. The ink tank 34 is inserted rearward into the installation case 110. An ink needle 112 is positioned on a rearward end surface 111 of the installation case 110 to extend frontward. The ink needle 112 is open at the front end, and linked to an ink tube 113 at the rear end. The ink tube 113 links the internal space of the ink needle 112 and the head unit 38 to allow the ink to flow there-through. If the ink tank 34 is inserted into the installation case 110, then the ink needle 112 is inserted into an outflow port 90 (see FIG. 3) of the ink tank 34. By virtue of this, the ink retained in the ink tank 34 is supplied to the head unit 38 through the ink needle 112 and the ink tube 113.

<The Ink Tank 34>

The ink tank 34 (an example of the container) retains the ink. The ink is a liquid containing a pigment and the like. The ink has a viscosity suitable for uniform dispersion of the pigment. The pigment serves to render a color to the ink. The ink tank 34 is removed from the installation case 110 if the ink is used up, and replaced by a new one retaining the ink.

Figure 3:
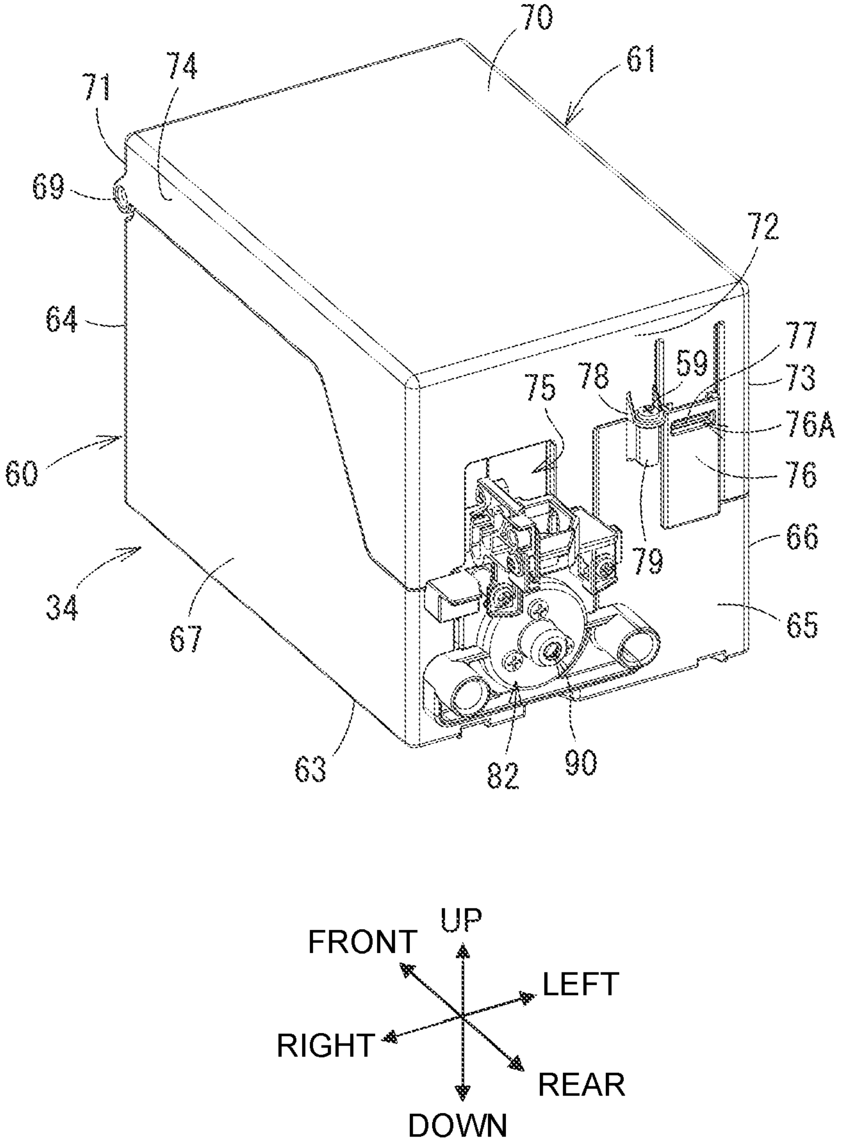
FIG. 3 is a perspective view of an ink tank 34 with a cover 61 in a first position.
Figure 4:
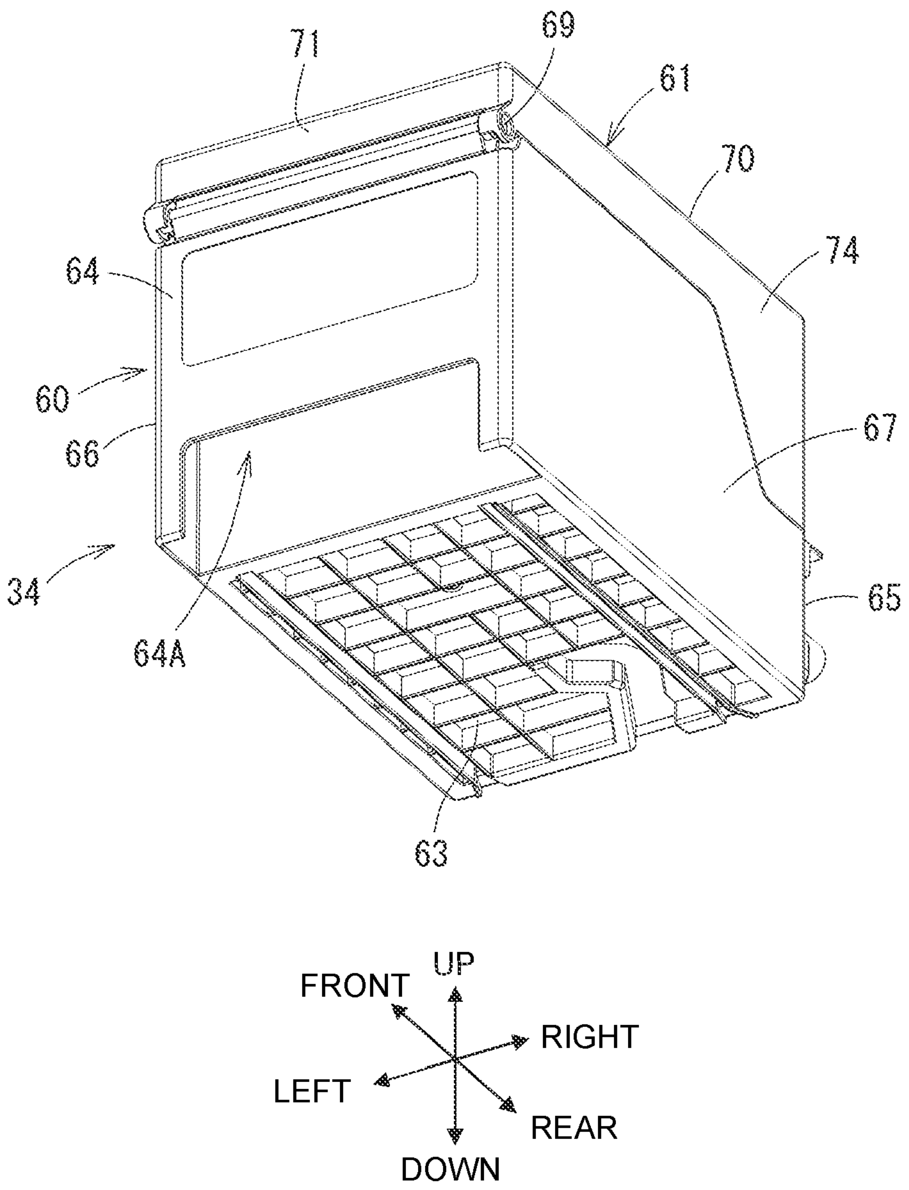
FIG. 4 is another perspective view of the ink tank 34 with the cover 61 in the first position.
Figure 5:
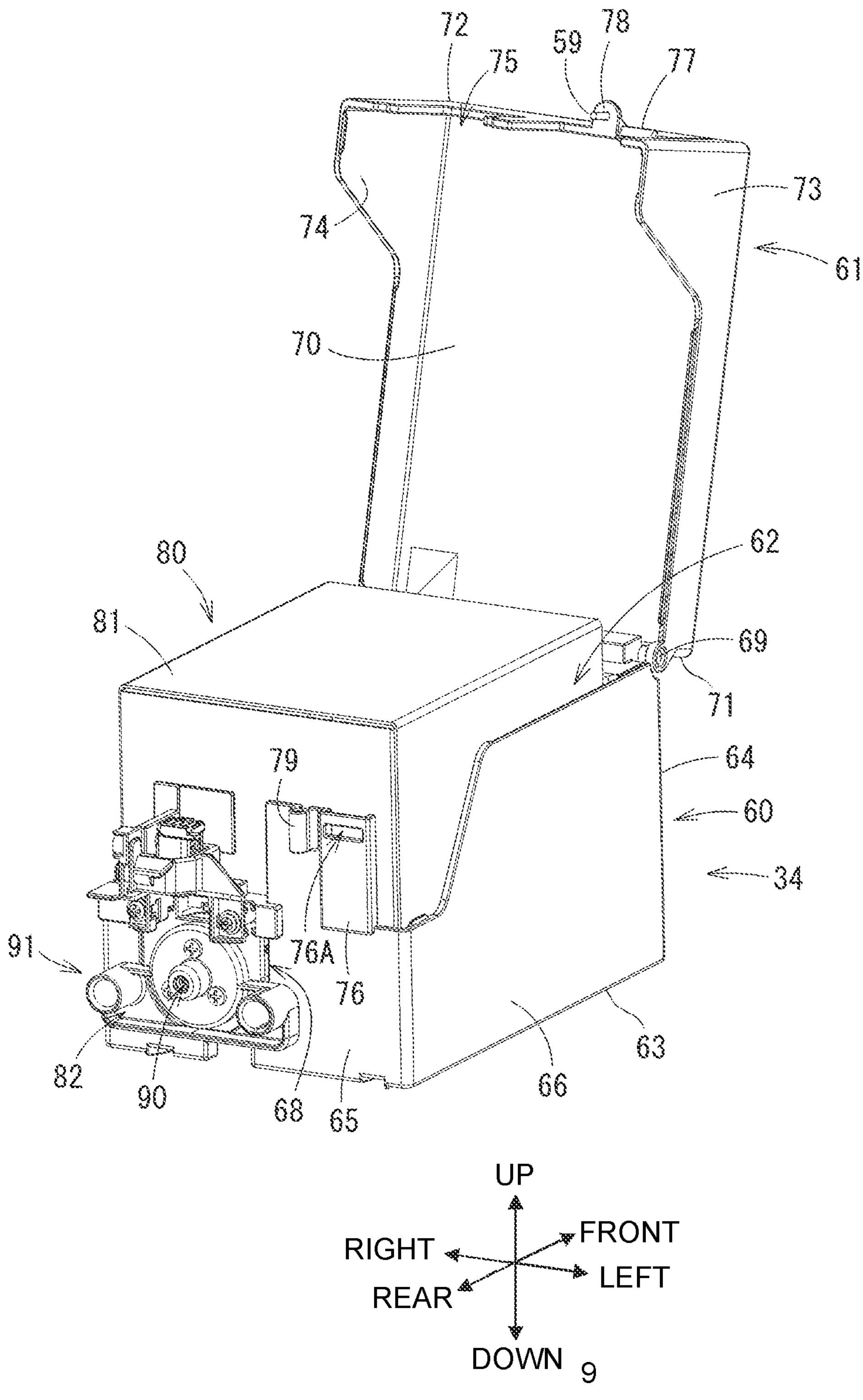
FIG. 5 is a perspective view of the ink tank 34 with the cover 61 in a second position.

As depicted in FIGS. 3 to 5, the ink tank 34 has the case 60, the cover 61, and a pouch 80. Note that the following explanation will be made with the ink tank 34 being installed in the installation case 110 for the correspondence between each direction of the casing 30 and the up-down direction, the front-rear direction, and the left-right direction of the ink tank 34.

The case 60 is a box-like member having an opening 62 facing upward and rearward. The case 60 has a lower wall 63, a front wall 64, a rear wall 65 (an example of the lateral wall), a left wall 66, and a right wall 67. The lower wall 63 is a rectangle elongated in the front-rear direction as viewed in the up-down direction. The front wall 64 extends upward from the front end of the lower wall 63. A recess 64A recessing rearward is formed in a lower end portion of the front wall 64. The recess 64A serves as a handle for a user to pull out the case 60. The rear wall 65 extends upward from the rear end of the lower wall 63. The upper end of the rear wall 65 is positioned below the upper end of the front wall 64.

The left wall 66 extends upward from the left end of the lower wall 63 to link the front wall 64 and the rear wall 65. Part of the upper end of the left wall 66 is inclined rearward and thus downward. The right wall 67 extends upward from the right end of the lower wall 63 to link the front wall 64 and the rear wall 65. Part of the upper end of the right wall 67 is inclined rearward and thus downward.

As depicted in FIG. 5, the opening 62 is defined by the upper end of the front wall 64, the upper end of the rear wall 65, the upper end of the left wall 66, and the upper end of the right wall 67. Due to the opening 62, the internal space of the case 60 is exposed to the outside. Part of the upper end of the rear wall 65 is formed with a notch 68 (an example of the locking portion) extending out of the opening 62 downward to allow for the flange 91 of a spout 82 to engage therewith.

The cover 61 is linked to the upper end of the front wall 64 of the case 60 in a rotatable manner via a rotating shaft 69. The rotating shaft 69 projects at the upper end and outward at the left and the right ends of the front wall 64 along the left-right direction. The cover 61 is rotatable with the left-right direction as the axis. The cover 61 is rotatable between a first position (the position depicted in FIG. 3) covering an (upper) part of the opening 62 of the case 60 and a second position (the position depicted in FIG. 5) to uncover the opening 62.

The cover 61 has an upper wall 70, a front wall 71, a rear wall 72 (an example of the leading end), a left wall 73, and a right wall 74. Note that the upper wall 70, the front wall 71, the rear wall 72, the left wall 73 and the right wall 74 will be explained on the reference of the cover 61 being in the first position. The upper wall 70 has the same planar shape as the lower wall 63 of the case 60, being a rectangle elongated in the front-rear direction as viewed in the up-down direction. The front wall 71 extends upward from the front end of the upper wall 70. The lower end of the front wall 71 is linked to the front wall 64 of the case 60 via the rotating shaft 69. The rear wall 72 extends downward from the rear end of the upper wall 70. The lower end of the rear wall 72 is positioned below the lower end of the front wall 64. Part of the lower end of the rear wall 72 is formed with a notch 75 extending upward. The notch 75 forms a continuous space with the notch 68 of the case 60 when the cover 61 is in the first position. In other words, the notch 75 of the rear wall 72 defines part of the opening 62 when the cover 61 is in the first position.

The left wall 73 extends downward from the left end of the upper wall 70 to link the front wall 71 and the rear wall 72. Part of the lower end of the left wall 73 is inclined rearward and thus downward. The right wall 74 extends downward from the right end of the upper wall 70 to link the front wall 71 and the rear wall 72. Part of the lower end of the right wall 74 is inclined rearward and thus downward.

A lock lever 76 is positioned on the rear wall 65 of the case 60. The lock lever 76 is linked to be rotatable with the left-right direction as the axis with respect to the rear wall 65. The lock lever 76 is rotatable between a lock position to extend along the outer surface of the rear wall 65 and an unlock position to stand up from the outer surface of the rear wall 65. A through hole 76A is formed in the leading end of the lock lever 76.

A claw 77 projects rearward and is positioned in the vicinity of the lower end of the rear wall 72 of the cover 61. When the cover 61 is in the first position, the claw 77 enters into the through hole 76A of the lock lever 76 in the lock position to get engaged. By virtue of this, the cover 61 is held in the first position. When the lock lever 76 is in the unlock position, the claw 77 is away from the through hole 76A of the lock lever 76. By virtue of this, the cover 61 in the first position is rotatable toward the second position.

Set screws 78 and 79 are positioned respectively in the vicinity of the upper end of the rear wall 65 of the case 60 and in the vicinity of the lower end of the rear wall 72 of the cover 61. When the cover 61 is in the first position, the set screws 78 and 79 face each other in the up-down direction. A hole (an example of the screw hole) is formed in each of the set screws 78 and 79 to extend in the up-down direction. If a screw 59 is inserted into the set screws 78 and 79 to screw together, then the cover 61 in the first position is fixed on the case 60.

Figure 6A:
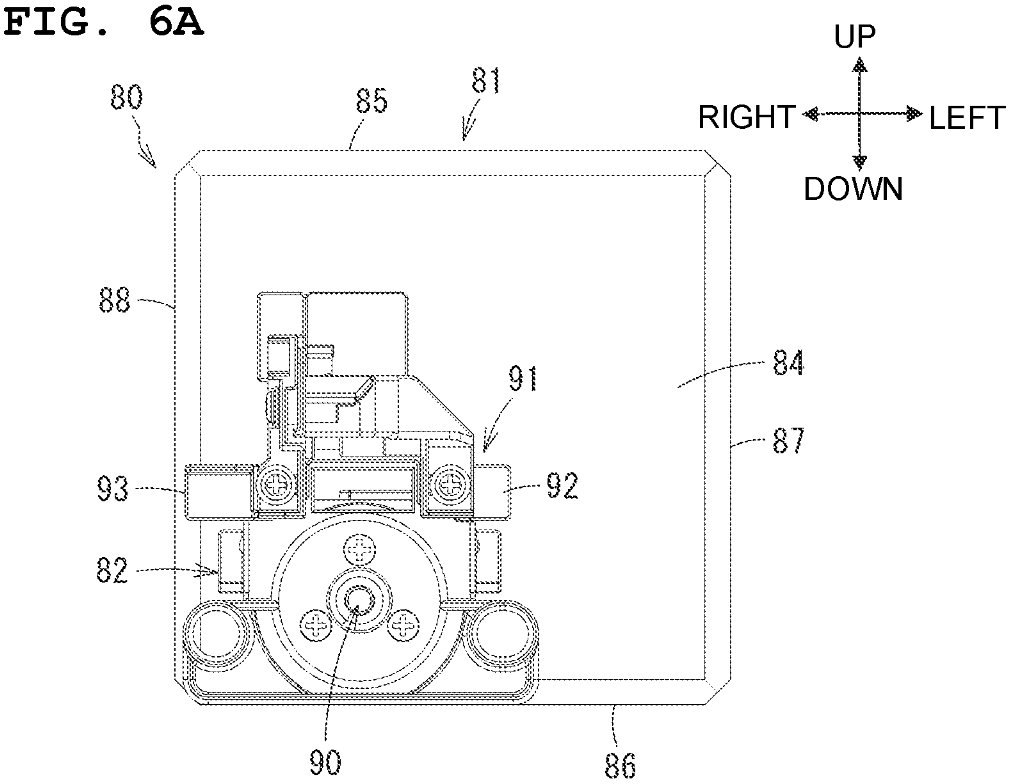
FIG. 6A is a rear side view of a pouch 80.
Figure 6B:
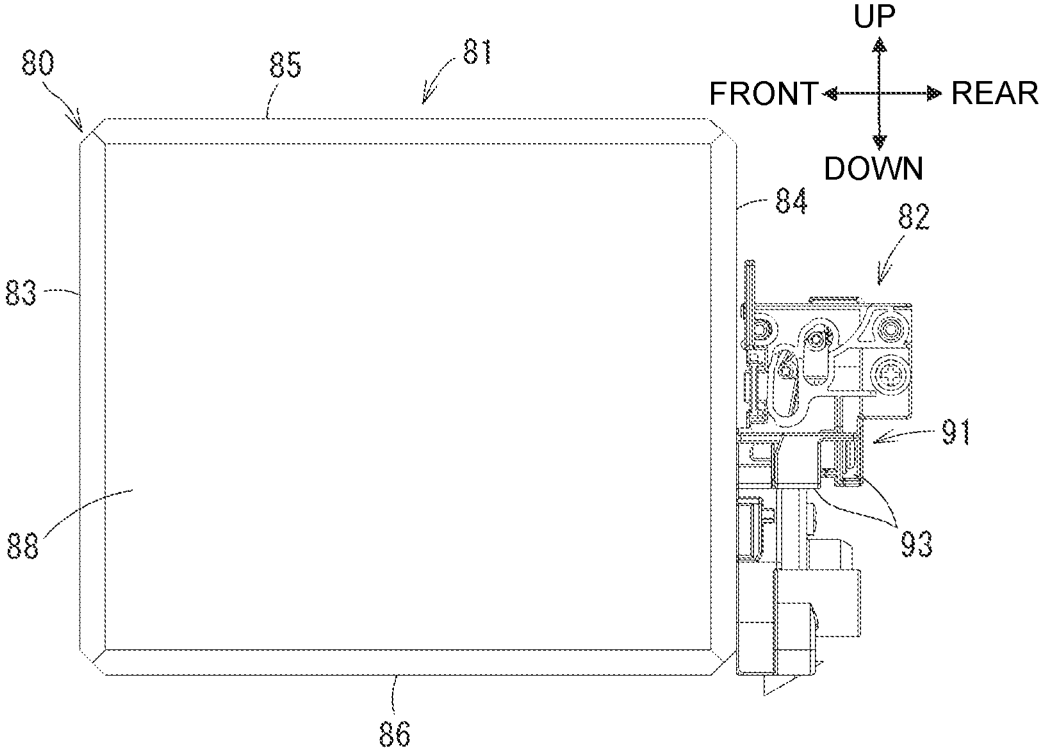
FIG. 6B is a left side view of the pouch 80.

As described in FIG. 5, the pouch 80 is accommodated in the internal space of the case 60 to retain the ink. As depicted in FIGS. 6A and 6B, the pouch 80 has a flexible bag 81, and the spout 82 (an example of the vent plug).

As depicted in FIGS. 6A and 6B and FIG. 9, the bag 81 is made by welding a sheet made of a synthetic resin, and expanding into a cube. In the cubic shape, the bag 81 is folded concavely inward in the front-rear direction in the parts forming a front wall 83 and a rear wall 84; and in the cubic shape, the bag 81 is folded convexly outward in the left-right direction in the parts forming a left wall 87 and a right wall 88. By virtue of this, as depicted in FIG. 9, it is possible to fold the bag 81 into a thin, flat and sheet-like shape. An upper wall 85 of the cube (see FIGS. 6A and 6B) is positioned at the upper surface of the folded bag 81. Without being depicted in FIG. 9, a lower wall 86 of the cube (see FIGS. 6A and 6B) is positioned at the lower surface of the folded bag 81. As depicted in FIG. 9, in the left wall 87 and the right wall 88, welded portions 89 are provided symmetrically in the left-right direction to extend in an inclined direction to the front-rear direction and the left-right direction, respectively. Thereby, in the bag 81, the liquid will not flow outward beyond the welded portions 89 in the left-right direction. By virtue of this, the bag 81 expends into a cubic shape to form the left wall 87 and the right wall 88.

As depicted in FIGS. 6A and 6B, the spout 82 is positioned in the vicinity of the lower end of the rear wall 84 of the bag 81. The spout 82 is a member made of a synthetic resin. The spout 82 has the outflow port 90 facing rearward. The outflow port 90 is an opening facing the outside of a flow channel for communication between the internal space of the bag 81 and the outside. A flow channel extends frontward from the outflow port 90 in the spout 82. The spout 82 is linked to the opening formed in the rear wall 84 of the bag 81. By virtue of this, that flow channel is in communication with the internal space of the bag 81. Note that although there is no detailed illustration, the outflow port 90 may be opened and closed by a valve or the like.

The flange 91 projects outward on the periphery of the outflow port 90 in the spout 82. The flange 91 is shaped to correspond to the notch 68 of the rear wall 65 of the case 60. As depicted in FIGS. 7 and 8, at the left and right ends of the flange 91, a pair of projection pieces 92 and 93 are positioned respectively to interpose the circumference of the notch 68 in the front-rear direction. With the flange 91 being inserted downward from above the notch 68, the circumference of the notch 68 of the rear wall 65 enters between each of the pairs of projection pieces 92 and 93. By virtue of this, the flange 91 is locked on the rear wall 65. Note that FIGS. 7 and 8 depict a state of the pairs of projection pieces 92 and 93 being inserted in the notch 68 of the rear wall 65, right before the circumference of the notch 68 of the rear wall 65 enters between each of the pairs of projection pieces 92 and 93. Further, the bag 81 is omitted in illustration.

<Method for Producing the Ink Tank 34>

A method for producing the ink tank 34 will be explained below.

With the cover 61 in the second position with respect to the case 60, the pouch 80 where the bag 81 is not filled with the ink is accommodated into the internal space of the case 60. On this occasion, the bag 81 of the pouch 80 is folded to be thinly flat as depicted in FIG. 9. The bag 81 folded thinly flat is larger in the size according to the left-right direction than the internal space of the case 60. Therefore, the left end and the right end of the bag 81, that is, the parts forming the left wall 87 and the right wall 88 are curved upward, in other words, the bag 81 is accommodated in the internal space of the case 60 to assume a curved U-shape. Further, the spout 82 of the pouch 80 is disposed in a notch 75 with the flange 91 being locked on the rear wall 65 as depicted in FIGS. 7 and 8. Being curved, the bag 81 is almost fitly accommodated in the internal space of the case 60 when expanded to be cubic such that the pouch 80 is accommodated in the internal space of the case 60 with the bag 81 which would be larger than the internal space of the case 60 when folded.

Next, as depicted in FIG. 4, the cover 61 rotates from the first position to the second position with respect to the case 60 to put the lock lever 76 into the lock position. Further, the screw 59 screws together in the holes of the set screws 78 and 79. By virtue of this, the cover 61 is held in the first position. Then, for example, a nozzle of an ink filler is inserted into the outflow port 90 of the spout 82 such that the ink fills the internal space of the folded bag 81 through that nozzle. Along with the ink filling, in the folded bag 81, the folded gusset parts are expanding, in other words, the front wall 83 and the rear wall 84 folded concavely inward stand up, and the left wall 87 and the right wall 88 folded convexly outward stand up, to take on the cubic shape depicted in FIGS. 5 and 6A and 6B.

<Technical Effects of the Embodiment>

According to the embodiment described above, such an operation can be carried out from the side of the rear wall 65 of the case 60: the cover 61 in the first position is moved to the second position, the pouch 80 is accommodated into the internal space of the case 60, the spout 82 is locked in the notch 68, the the cover 61 in the second position is moved to the first position, and the lock lever 76 is moved from the unlock position to the lock position. Therefore, it is easy to accommodate the pouch 80 into the case 60 to assemble the same.

Further, when the cover 61 is put into the second position, it is easy to accommodate the pouch 80 into the internal space of the case 60 through the opening 62.

Further, because the ink can fill the pouch 80 accommodated in the case 60 where part of the opening 62 is covered by the cover 61, a better handleability is attained compared to the method of installing the pouch 80 filled with the ink into the case 60.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<Modifications>

In the embodiment described above, the opening 62 of the case 60 faces upward and rearward. However, the opening 62 may face upward only. Further, along with a change in the shape of the opening 62, the cover 61 may also change in shape appropriately.

Further, the lock lever 76 may be positioned on the left wall 66 or the right wall 67 instead of the rear wall 65, or be positioned on the cover 61. Further, in the same manner, the set screws 78 and 79 may be positioned on the left wall 66 or the right wall 67 instead of the rear wall 65, or be positioned differently from the lock lever 76.

Further, in the embodiment described above, the ink is taken as one example of liquid in the explanation. However, for example, instead of an ink, a preprocessing liquid to be discharged to paper or the like before the ink is discharged for printing may be retained in the ink tank 34. Further, water for cleansing the head module 49 may be retained in the ink tank 34. Further, when the image recording apparatus 100 is to be shipped or stored for a long time, a preservative solution (storage solution; shipment solution) introduced into the ink tube 113 may be retained in the ink tank 34, for preventing solidification of the ink in the ink tube 113. On this occasion, as a preservative solution, a liquid having a property of anti or less volatility may be adopted.

The present disclosure may include the following aspect. The opening may uncover the internal space of the case in the upward direction, whereas the cover in the first position may block an upper part of the opening.

When the cover is at the second position, it is easy to accommodate the pouch into the internal space of the case via the opening.

The bag may contain a liquid; the vent plug may have an outflow port for the liquid contained in the bag to flow out, and a flange positioned around the outflow port; and the locking portion may lock the flange.

The container may have a screw and a screw hole to link the case and the cover in the first position.

According to a second aspect of the present disclosure, there is provided a method for producing a container, the method including: accommodating a pouch having a flexible bag and a vent plug in an internal space of a box-like case having a lower wall and a lateral wall upstanding from the lower wall, locking the vent plug at the periphery of an opening exposing the internal space of the case via at least part of the lateral wall, and filling the bag with a liquid via the vent plug with the opening of the case being blocked by the cover.

According to the above, because it is possible to fill the pouch with the liquid accommodated in the case with the opening being blocked by the cover, there is a better operability than the means of installing the pouch filled with the liquid into the case.

What is claimed is:

1. A container comprising:

a case with an opening, the case including a lower wall and a lateral wall upstanding from the lower wall;

a cover including a leading end, and a base end being opposed to the leading end and linked to the case in a rotatable manner, the cover being configured to move between a first position blocking a part of the opening of the case and a second position uncovering the opening of the case;

a pouch including a flexible bag and a vent plug; and a locking part configured to move between a lock position to hold the cover in the first position on the case and an unlock position allowing the cover to rotate from the first position, wherein the opening exposes an internal space via a part of the lateral wall, the lateral wall defining the opening includes a locking portion to lock the vent plug, in a case that the cover is at the first position, the leading end of the cover defines the opening, and the locking part is positioned at the lateral wall defining the opening or at the leading end of the cover.

2. The container according to claim 1, wherein in a case that the cover is at the second position, the internal space of the case is exposed via the opening from above, in a case that the cover is at the first position, the cover blocks the opening from above.

3. The container according to claim 1, wherein the bag is configured to contain a liquid, the vent plug includes an outflow port for the liquid contained in the bag to flow out, and a flange positioned around the outflow port, and the locking portion is configured to lock the flange.

4. The container according to claim 1, further comprising a screw and a screw hole to link the case and the cover in the first position.

5. A method for producing a container, the method comprising:

preparing a case including a lower wall and a lateral wall upstanding from the lower wall;

preparing a pouch including a flexible bag and a vent plug;

accommodating the pouch in an internal space of the case, and locking the vent plug at a periphery of an opening exposing the internal space of the case via at least a part of the lateral wall; and filling the bag with a liquid via the vent plug while blocking the opening of the case by a cover.

* * * * *